(12) United States Patent
Roberge

(10) Patent No.: US 11,333,076 B2
(45) Date of Patent: May 17, 2022

(54) POWER TAKEOFF TRANSMISSION

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 625 days.

(21) Appl. No.: 15/851,089

(22) Filed: Dec. 21, 2017

(65) Prior Publication Data

US 2019/0195139 A1   Jun. 27, 2019

(51) Int. Cl.
*F02C 7/32* (2006.01)
*F02C 7/36* (2006.01)

(52) U.S. Cl.
CPC .............. *F02C 7/32* (2013.01); *F02C 7/36* (2013.01); *F05D 2220/32* (2013.01); *F05D 2220/323* (2013.01); *F05D 2220/36* (2013.01); *F05D 2220/50* (2013.01); *F05D 2240/14* (2013.01); *F05D 2240/60* (2013.01); *F05D 2260/4031* (2013.01)

(58) Field of Classification Search
CPC .... F02C 7/32; F02C 7/36; F01D 15/12; F01D 13/00
See application file for complete search history.

(56) References Cited

U.S. PATENT DOCUMENTS

| | | | |
|---|---|---|---|
| 2,608,056 A | 8/1952 | Secord et al. | |
| 2,978,869 A * | 4/1961 | Hiscock | F02C 7/32 60/802 |
| 4,062,186 A | 12/1977 | Snow et al. | |
| 4,912,921 A | 4/1990 | Rice et al. | |
| 7,412,819 B2 * | 8/2008 | Bart | F02K 3/065 60/226.1 |
| 7,552,582 B2 * | 6/2009 | Eick | F02C 3/107 60/39.163 |
| 8,042,341 B2 * | 10/2011 | Charier | F02C 7/32 60/788 |
| 8,146,370 B2 | 4/2012 | Zeiner et al. | |
| 8,172,512 B2 | 5/2012 | Short et al. | |
| 8,800,918 B2 | 8/2014 | Morris et al. | |
| 8,814,502 B2 | 8/2014 | Eleftheriou | |
| 9,200,592 B2 | 12/2015 | Berryann et al. | |
| 2006/0272313 A1 | 12/2006 | Eick et al. | |
| 2009/0205341 A1 | 8/2009 | Muldoon | |

(Continued)

OTHER PUBLICATIONS

European Search Report Issued in EP Application No. 18214850.2, dated Aug. 27, 2019, 55 Pages.

*Primary Examiner* — Richard A Edgar
*Assistant Examiner* — John S Hunter, Jr.
(74) *Attorney, Agent, or Firm* — Cantor Colburn LLP

(57) ABSTRACT

A power takeoff and gearbox system of a multi-spool gas turbine engine includes a high rotor towershaft operably connected to and driven by a first spool of the gas turbine engine, a first gearbox operably connected to the high rotor towershaft, a low rotor towershaft operably connected to and driven by a second spool of the gas turbine engine, and a second gearbox operably connected to the low rotor towershaft. The high rotor towershaft is located at a first case of the gas turbine engine and the low rotor towershaft is located at a second case of the gas turbine engine axially forward of the first case.

14 Claims, 6 Drawing Sheets

(56) References Cited

U.S. PATENT DOCUMENTS

2009/0212156 A1* 8/2009 Blumer .................. B64D 35/08
                                                        244/60
2010/0005810 A1    1/2010 Jarrell et al.
2014/0090386 A1    4/2014 Cloft et al.
2016/0230843 A1    8/2016 Duong et al.

* cited by examiner

POWER TAKEOFF TRANSMISSION

BACKGROUND

Exemplary embodiments pertain to the art of gas turbine engines, and more particularly to power takeoff on gas turbine engines.

Gas turbine engines utilize rotational energy from one or more rotor shafts of the gas turbine to provide power to drive electrical subsystems, thermal management systems and other aircraft subsystems. Such power extraction is typically accomplished via a tower shaft rotational coupled to a high rotor shaft of the gas turbine engine. Future aircraft systems are projected to need higher levels of power extraction for such systems. To accommodate this demand in a way that minimizes adverse impact on engine performance and operability, low rotor power takeoff systems are being explored. One method involves geared transmission from both high and low rotors. The addition of low rotor gears can cause the distance between high and low rotor thrust bearings to increase to accommodate gearing. Such an increase in distance between the high rotor thrust bearings and low rotor thrust bearings results in an increase in engine weight, overall length and cost, and loss of low rotor critical speed margin, etc. In addition, physical interaction with airframe subsystems may benefit from additional options involving the placement of power extraction. Alternate configurations are desired.

SUMMARY

In one embodiment, a power takeoff and gearbox system of a multi-spool gas turbine engine includes a high rotor towershaft operably connected to and driven by a first spool of the gas turbine engine, a first gearbox operably connected to the high rotor towershaft, a low rotor towershaft operably connected to and driven by a second spool of the gas turbine engine, and a second gearbox operably connected to the low rotor towershaft. The high rotor towershaft is located at a first case of the gas turbine engine and the low rotor towershaft is located at a second case of the gas turbine engine axially forward of the first case.

Additionally or alternatively, in this or other embodiments, the low rotor towershaft is located at a fan inlet case of a gas turbine engine.

Additionally or alternatively, in this or other embodiments the low rotor towershaft extends through a strut of the fan inlet case.

Additionally or alternatively, in this or other embodiments the low rotor towershaft is accessible via a removable nosecone of the gas turbine engine.

Additionally or alternatively, in this or other embodiments the low rotor towershaft and the high rotor towershaft are configured to extend in the same radial direction from an engine central longitudinal axis.

Additionally or alternatively, in this or other embodiments a high rotor bevel gear and a high rotor bevel gear pinion connect the high rotor towershaft to the first spool to drive rotation of the high rotor towershaft.

Additionally or alternatively, in this or other embodiments a low rotor bevel gear and a low rotor bevel gear pinion connect the low rotor towershaft to the second spool to drive rotation of the low rotor towershaft.

In another embodiment, a gas turbine engine includes a high speed spool, a low speed spool, and a power takeoff and gearbox system. The power takeoff and gearbox system includes a high rotor towershaft operably connected to and driven by the high speed spool of the gas turbine engine, a first gearbox operably connected to the high rotor towershaft, a low rotor towershaft operably connected to and driven by the low speed spool of the gas turbine engine, and a second gearbox operably connected to the low rotor towershaft. The high rotor towershaft is located at a first case of the gas turbine engine and the low rotor towershaft is located at a second case of the gas turbine engine axially forward of the first case.

Additionally or alternatively, in this or other embodiments the second case is a fan inlet case.

Additionally or alternatively, in this or other embodiments the low rotor towershaft extends through a strut of the fan inlet case.

Additionally or alternatively, in this or other embodiments the low rotor towershaft is accessible via a removable nosecone of the gas turbine engine.

Additionally or alternatively, in this or other embodiments the low rotor towershaft is located axially forward of a low rotor thrust bearing.

Additionally or alternatively, in this or other embodiments the first case is an intermediate case.

Additionally or alternatively, in this or other embodiments the high rotor towershaft is located axially between a low rotor radial bearing and a high rotor thrust bearing.

Additionally or alternatively, in this or other embodiments the low rotor towershaft and the high rotor towershaft extend in the same radial direction from an engine central longitudinal axis.

Additionally or alternatively, in this or other embodiments a high rotor bevel gear and a high rotor bevel gear pinion connects the high rotor towershaft to the first spool to drive rotation of the high rotor towershaft.

Additionally or alternatively, in this or other embodiments a low rotor bevel gear and a low rotor bevel gear pinion connects the low rotor towershaft to the second spool to drive rotation of the low rotor towershaft.

In yet another embodiment, an aircraft includes an airframe, a first engine located at the airframe and a second engine disposed at the airframe. Each engine of the first engine and the second engine includes a power takeoff and gearbox system including a high rotor towershaft operably connected to and driven by the high speed spool of the gas turbine engine, a first gearbox operably connected to the high rotor towershaft, and a low rotor towershaft operably connected to and driven by the low speed spool of the gas turbine engine. The high rotor towershaft is located at a first case of the gas turbine engine and the low rotor towershaft is disposed at a second case of the gas turbine engine axially forward of the first case. Each low rotor towershaft extends to a power combining gearbox located between the first engine and the second engine.

Additionally or alternatively, in this or other embodiments the second case is a fan inlet case.

Additionally or alternatively, in this or other embodiments the high rotor towershaft is located axially between a low rotor radial bearing and a high rotor thrust bearing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
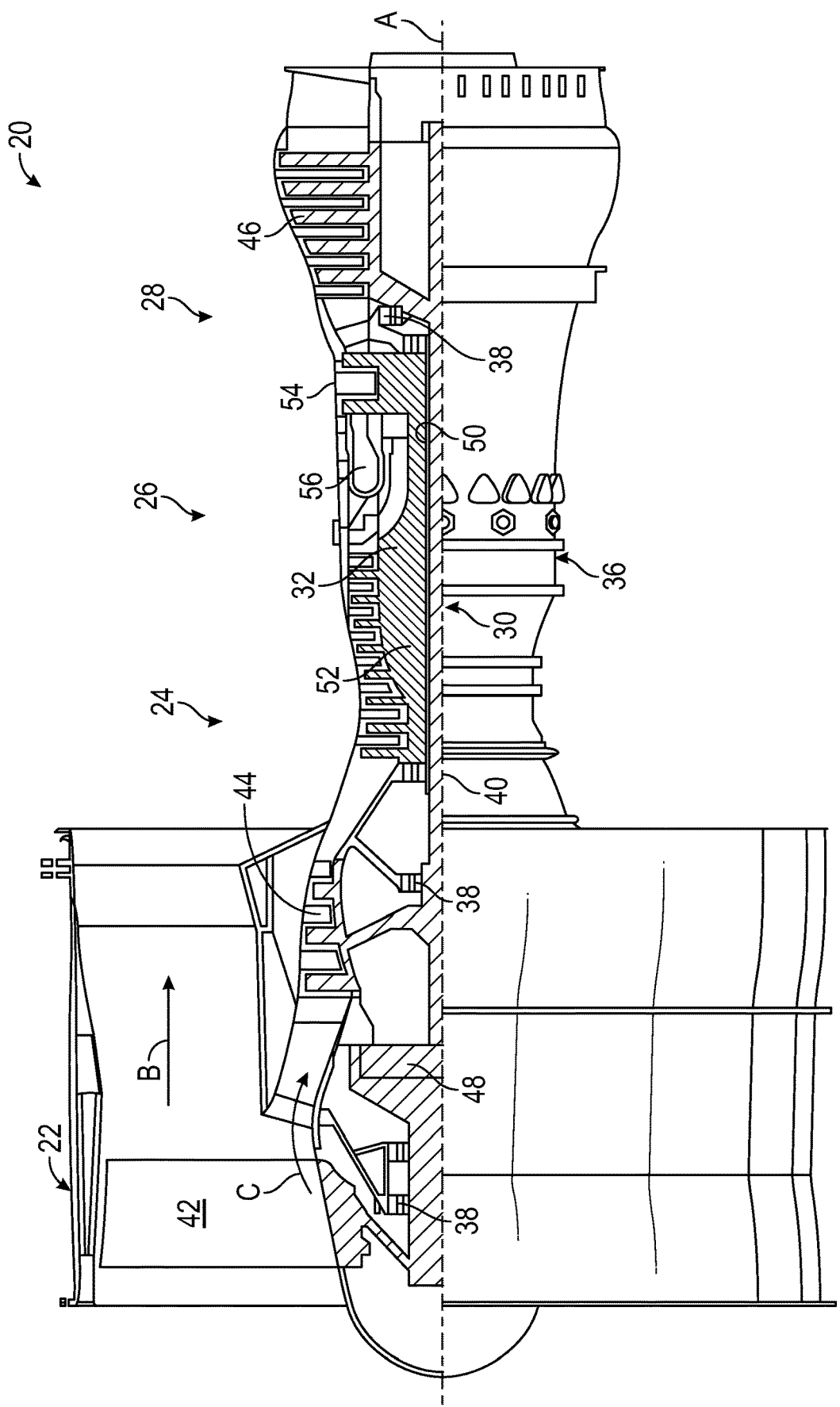
FIG. 1 is a cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \ °\text{R})/(518.7° \text{R})]^{0.5}$. The "Low corrected fan tip speed" as disclosed herein according to one non-limiting embodiment is less than about 1150 ft/second (350.5 m/sec).

Figure 2:
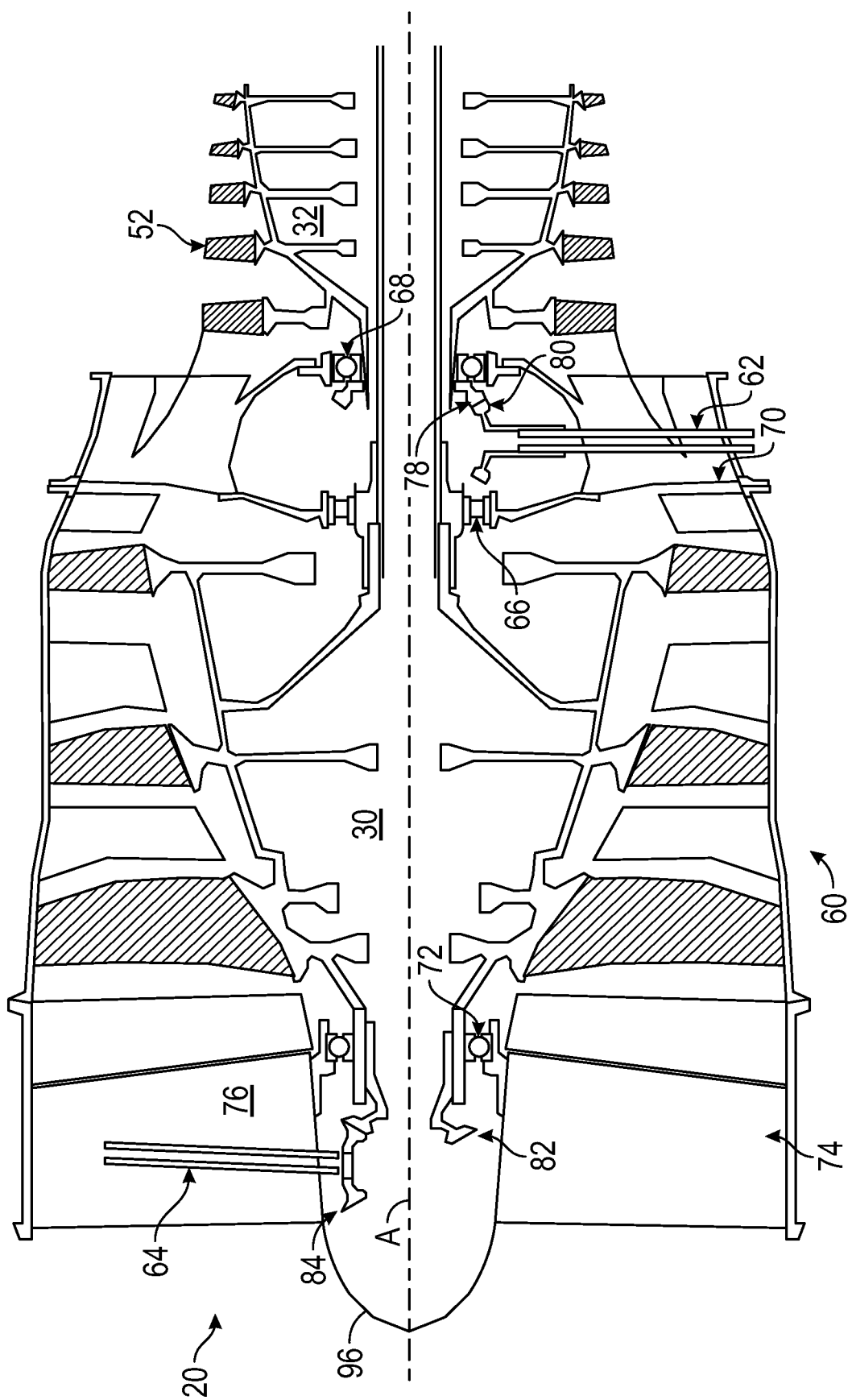
FIG. 2 is a partial cross-sectional view of an embodiment of a power takeoff and gearbox system of a gas turbine engine.

Referring now to FIG. 2, illustrated is an embodiment of a power takeoff and gearbox system 60. The system 60 includes a high rotor towershaft 62 operably connected to the high speed spool 32 to extract power from the rotation of the high speed spool 32. Further, the system 60 includes a low rotor towershaft 64 operably connected to the low speed spool 30 to extract power from the rotation of the low speed spool 30.

Further, the high rotor towershaft 62 is located axially, relative to the engine central longitudinal axis A, between a low rotor radial bearing 66 and a high rotor thrust bearing 68, both of which are disposed at an intermediate case 70. A low rotor thrust bearing 72 is located axially forward of the low rotor radial bearing 66 at a fan inlet case 74, with the low rotor towershaft 64 located axially forward of the low rotor thrust bearing 72. In some embodiments, the low rotor towershaft 64 extends through a fan inlet strut 76.

The high rotor towershaft 62 is operably connected to the high speed spool 32 via a high rotor bevel gear 78 fixed to the high speed spool 32 and a high rotor bevel gear pinion 80 fixed to the high rotor towershaft 62 and meshed with the high rotor bevel gear 78, such that rotation of the high speed spool 32 drives rotation of the high rotor towershaft 62. Similarly, a low rotor bevel gear 82 is fixed to the low speed spool 30, and is meshed with a low rotor bevel gear pinion 84 fixed to the low rotor towershaft 64, such that rotation of the low speed spool 30 drives rotation of the low rotor towershaft 64.

Figure 3:
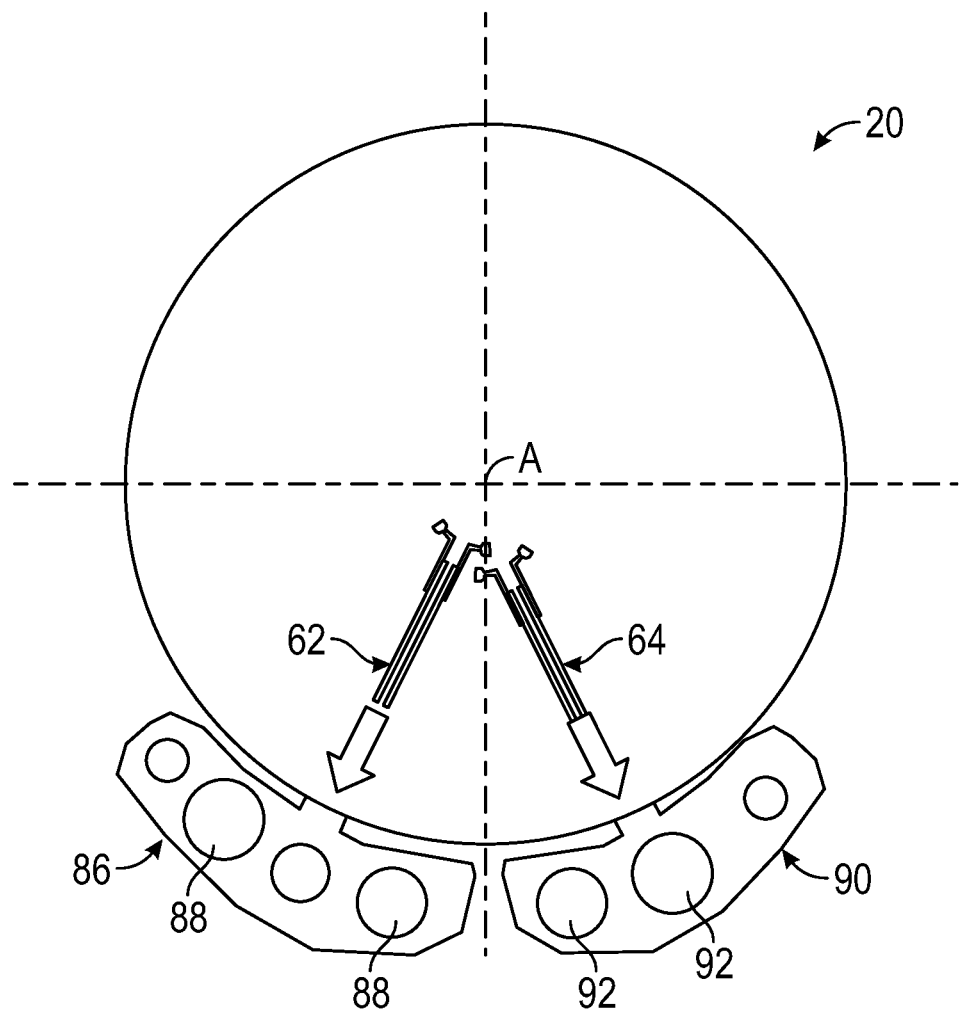
FIG. 3 is a schematic view of an embodiment of a power takeoff and gearbox system of a gas turbine engine.

Referring to FIG. 3, in some embodiments, the high rotor towershaft 62 is operably connected to a first accessory drive gearbox 86 to provide power to one or more high rotor driven accessory components 88 connected to the first accessory drive gearbox 86. Similarly, the low rotor towershaft 64 is operably connected to a second accessory drive gearbox 90 to provide power to one or more low rotor driven accessory components 92 connected to the second accessory drive gearbox 90. It is to be noted that although both the low rotor towershaft 64 and the high rotor towershaft 62 are shown in FIG. 3, the towershafts 62, 64 reside in different axial planes. As shown in FIG. 3, in some embodiments, the low rotor towershaft 64 and the high rotor towershaft 62 reside at different angular positions about the engine central longitudinal axis A including on the upper and/or lower half of the engine.

Figure 4:
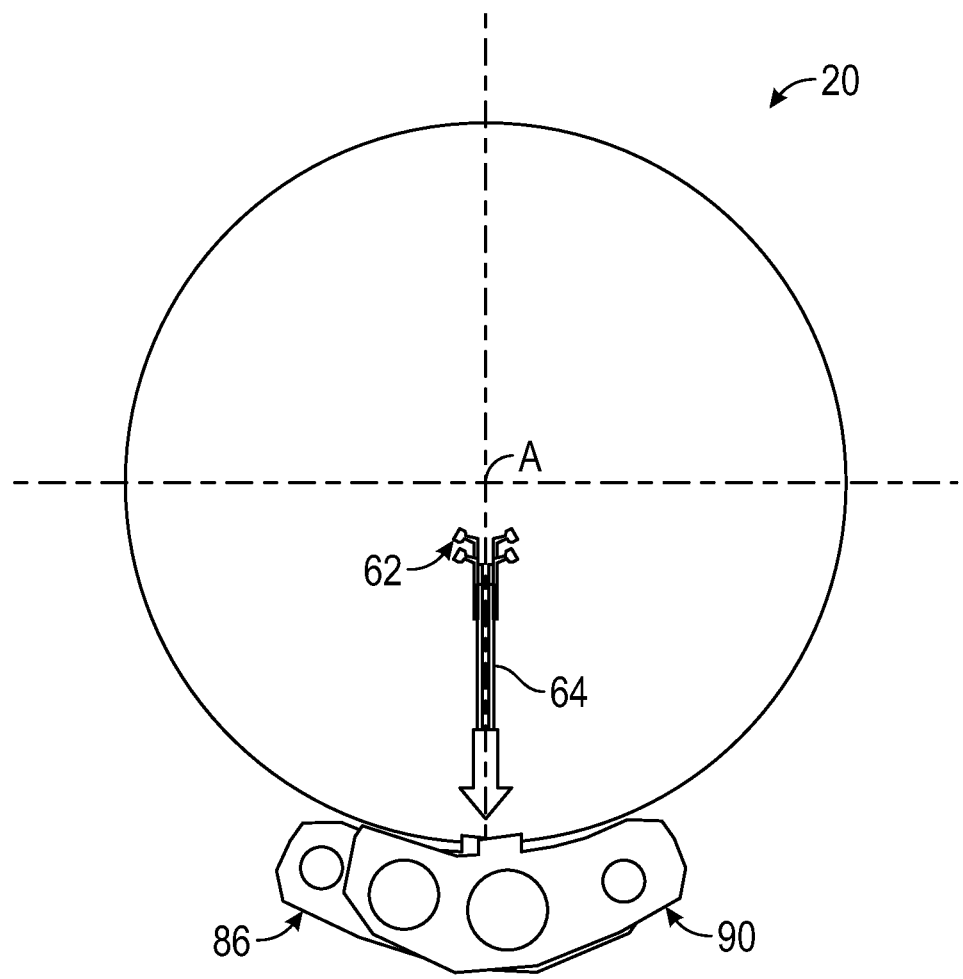
FIG. 4 is another schematic cross-sectional view of an embodiment of a power takeoff and gearbox system of a gas turbine engine.

Referring to FIG. 4, in other embodiments the low rotor towershaft 64 and the high rotor towershaft 62 may have the same angular position relative to the engine central longitudinal axis A. In some embodiments, such as shown, the high rotor towershaft 62 and the low rotor towershaft 64, are each oriented to extend toward a bottom dead center position. It is to be appreciated, however, that this position is merely exemplary and that the towershafts 62, 64 may extend at other angular positions relative to the engine central longitudinal axis A.

Figure 5:
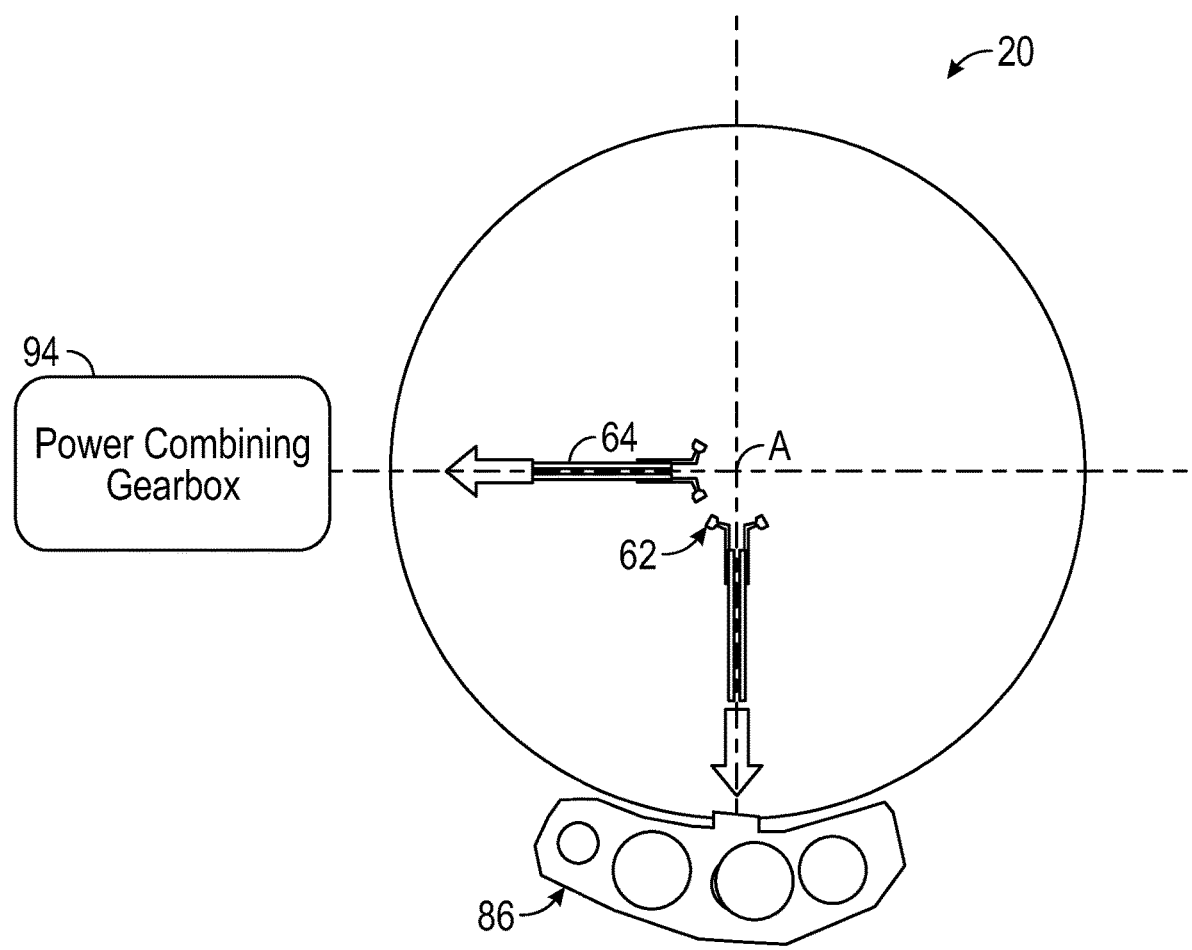
FIG. 5 is a schematic cross-sectional view of an embodiment of a power takeoff and gearbox system of a gas turbine engine including a power combining gearbox.
Figure 6:
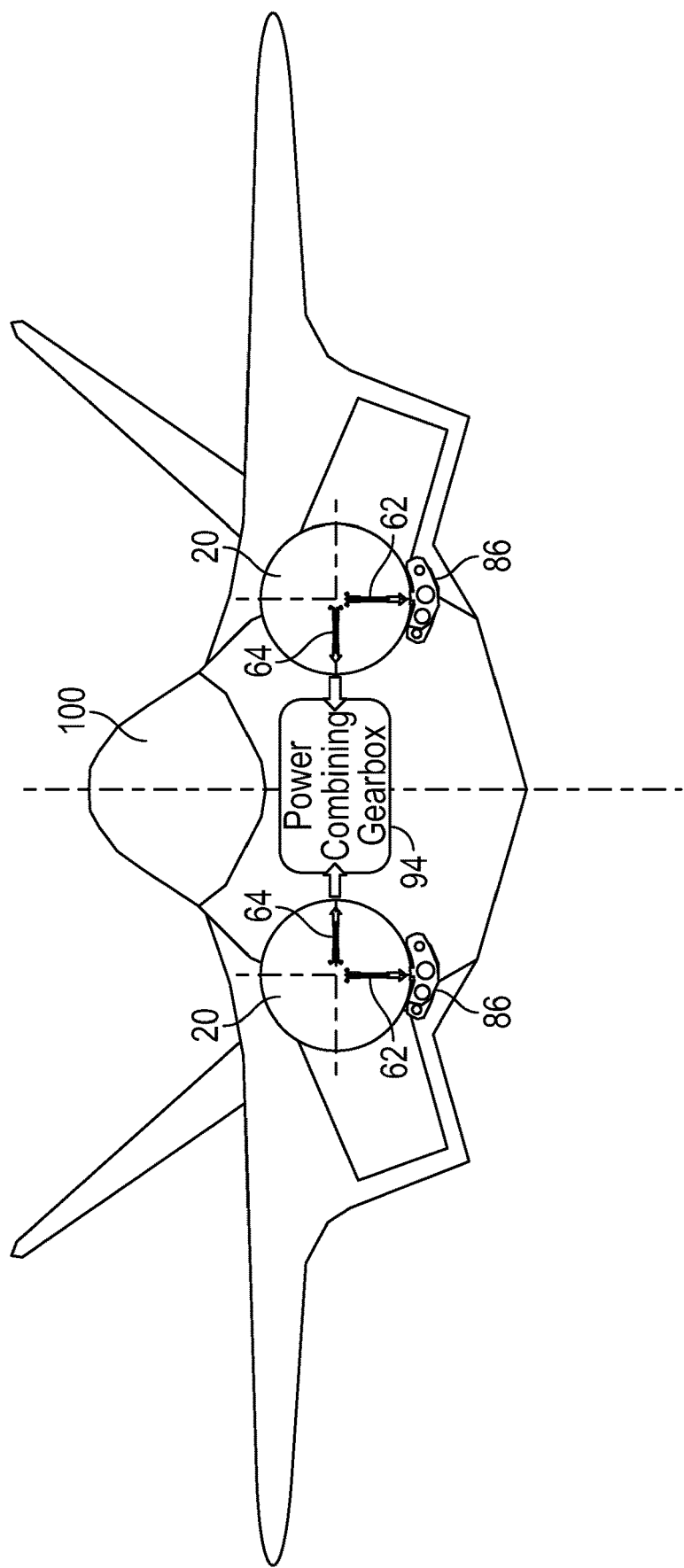
FIG. 6 is a schematic cross-sectional view of an embodiment of an aircraft.

Referring now to FIG. 5, one of the towershafts, for example the low rotor towershaft 64 extends to a power combining gearbox 94, where the rotational energy provided by the low rotor towershaft 64 is combined with that of another towershaft, for example, a second low rotor towershaft 64 of a second gas turbine engine 20, as shown best in FIG. 6. In the embodiment of FIG. 6, two engines 20 are disposed in an airframe 100. Each engine 20 has a high rotor towershaft 62 and a low rotor towershaft 64. Each high rotor towershaft 62 extends to a first accessory drive gearbox 86, while each low rotor towershaft 64 extends to the power combining gearbox 94 disposed between the two engines 20. In such embodiments, the gas turbine engine 20 may be field-reconfigurable to change an angular position of the low rotor towershaft 64 with minimal disassembly of the gas turbine engine. This enables interchangeability of engines while in service thereby minimizing the logistics impact of having unique left and right side engines. The low rotor towershaft 64 may be accessible by removal of a nosecone 96 (shown in FIG. 2). Removal of the nosecone 96 provides access to the low rotor towershaft 64 such that its angular position may be changed.

The configurations disclosed herein enhance design flexibility by allowing for low rotor towershaft 64 and high rotor towershaft 62 angular position to be the same, for example, toward bottom dead center, and alternative angular positions for the low rotor towershaft 64 may be utilized by reconfiguring the low rotor towershaft 64 angular position via the removable nosecone 96.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power takeoff and gearbox system of a multi-spool gas turbine engine, comprising:
   a high rotor towershaft operably connected to and driven by a first spool of the multi-spool gas turbine engine;
   a first gearbox operably connected to the high rotor towershaft to provide power to one or more high rotor driven accessory components;
   a low rotor towershaft operably connected to and driven by a second spool of the multi-spool gas turbine engine, wherein the second spool comprises a compressor spool portion, a turbine spool portion, and an inner shaft spool portion that connects the compressor spool portion to the turbine spool portion; and
   a second gearbox operably connected to the low rotor towershaft to provide power to one or more low rotor driven accessory components;
   wherein the high rotor towershaft extends through a first case of the multi-spool gas turbine engine and the low rotor towershaft extends through a second case of the multi-spool gas turbine engine axially forward of the first case; and
   wherein the low rotor towershaft and the high rotor towershaft reside at different angular positions about an engine central longitudinal axis of the multi-spool gas turbine engine;
   wherein the first case is an intermediate case; and
   wherein the high rotor towershaft is disposed axially between a low rotor radial bearing and a high rotor thrust bearing, the low rotor radial bearing and the high rotor thrust bearing both disposed in the intermediate case, the low rotor radial bearing disposed axially forward of the high rotor thrust bearing;
   wherein the low rotor towershaft is disposed axially forward of a low rotor thrust bearing, the low rotor thrust bearing disposed axially forward of the low rotor radial bearing;

wherein the low rotor thrust bearing is disposed at a first axial end of the compressor spool portion, and the low rotor radial bearing is disposed at a second axial end of the compressor spool portion opposite the first axial end.

2. The power takeoff and gearbox system of claim 1, wherein the second case is a fan inlet case of the multi-spool gas turbine engine.

3. The power takeoff and gearbox system of claim 2, wherein the low rotor towershaft extends through a strut of the fan inlet case.

4. The power takeoff and gearbox system of claim 2, wherein the low rotor towershaft is accessible via removal of a nosecone of the multi-spool gas turbine engine.

5. The power takeoff and gearbox system of claim 1, further comprising a high rotor bevel gear and a high rotor bevel gear pinion to connect the high rotor towershaft to the first spool to drive rotation of the high rotor towershaft.

6. The power takeoff and gearbox system of claim 1, further comprising a low rotor bevel gear and a low rotor bevel gear pinion to connect the low rotor towershaft to the second spool to drive rotation of the low rotor towershaft.

7. A gas turbine engine, comprising:
a high speed spool;
a low speed spool, wherein the low speed spool comprises a low speed compressor spool portion, a low speed turbine spool portion, and a low speed inner shaft spool portion that connects the low speed compressor spool portion to the low speed turbine spool portion; and
a power takeoff and gearbox system comprising:
  a high rotor towershaft operably connected to and driven by the high speed spool of the gas turbine engine;
  a first gearbox operably connected to the high rotor towershaft to provide power to one or more high rotor driven accessory components;
  a low rotor towershaft operably connected to and driven by the low speed spool of the gas turbine engine; and
  a second gearbox operably connected to the low rotor towershaft to provide power to one or more low rotor driven accessory components;
wherein the high rotor towershaft extends through a first case of the gas turbine engine and the low rotor towershaft extends through a second case of the gas turbine engine axially forward of the first case; and
wherein the low rotor towershaft and the high rotor towershaft reside at different angular positions about an engine central longitudinal axis of the gas turbine engine;
wherein the first case is an intermediate case; and
wherein the high rotor towershaft is disposed axially between a low rotor radial bearing and a high rotor thrust bearing, the low rotor radial bearing and the high rotor thrust bearing both disposed in the intermediate case, the low rotor radial bearing disposed axially forward of the high rotor thrust bearing;
wherein the low rotor towershaft is disposed axially forward of a low rotor thrust bearing, the low rotor thrust bearing disposed axially forward of the low rotor radial bearing;
wherein the low rotor thrust bearing is disposed at a first axial end of the low speed compressor spool portion, and the low rotor radial bearing is disposed at a second axial end of the low speed compressor spool portion opposite the first axial end.

8. The gas turbine engine of claim 7, wherein the second case is a fan inlet case.

9. The gas turbine engine of claim 8, wherein the low rotor towershaft extends through a strut of the fan inlet case axially forward of a fan rotor blade.

10. The gas turbine engine of claim 8, wherein the low rotor towershaft is accessible via removal of a nosecone of the gas turbine engine.

11. The gas turbine engine of claim 7, further comprising a high rotor bevel gear and a high rotor bevel gear pinion to connect the high rotor towershaft to the first spool to drive rotation of the high rotor towershaft.

12. The gas turbine engine of claim 7, further comprising a low rotor bevel gear and a low rotor bevel gear pinion to connect the low rotor towershaft to the second spool to drive rotation of the low rotor towershaft.

13. An aircraft comprising:
an airframe;
a first engine disposed at the airframe; and
a second engine disposed at the airframe;
each engine of the first engine and the second engine including:
  a power takeoff and gearbox system including:
    a high rotor towershaft operably connected to and driven by a high speed spool;
    a first gearbox operably connected to the high rotor towershaft to provide power to one or more high rotor driven accessory components; and
    a low rotor towershaft operably connected to and driven by a low speed spool, wherein the low speed spool comprises a low speed compressor spool portion, a low speed turbine spool portion, and a low speed inner shaft spool portion that connects the low speed compressor spool portion to the low speed turbine spool portion;
  wherein the high rotor towershaft of each engine extends through a first case and the low rotor towershaft extends through a second case axially forward of the first case;
  wherein the first case is an intermediate case; and
  wherein the high rotor towershaft is disposed axially between a low rotor radial bearing and a high rotor thrust bearing, the low rotor radial bearing and the high rotor thrust bearing both disposed in the intermediate case, the low rotor radial bearing disposed axially forward of the high rotor thrust bearing;
  wherein the low rotor towershaft is disposed axially forward of a low rotor thrust bearing, the low rotor thrust bearing disposed axially forward of the low rotor radial bearing;
  wherein the low rotor thrust bearing is disposed at a first axial end of the low speed compressor spool portion, and the low rotor radial bearing is disposed at a second axial end of the low speed compressor spool portion opposite the first axial end;
wherein the low rotor towershaft of each of the first engine and the second engine extends to a power combining gearbox disposed between the first engine and the second engine; and wherein the low rotor towershaft and the high rotor towershaft of each of the first engine and the second engine reside at different angular positions about an engine central longitudinal axis of their respective engines.

14. The aircraft of claim 13, wherein the high rotor towershaft of each of the first engine and the second engine extends through a fan inlet case of the respective first engine and second engine.

* * * * *